United States Patent
Kaita et al.

(10) Patent No.: US 11,505,273 B2
(45) Date of Patent: Nov. 22, 2022

(54) STRADDLE TYPE VEHICLE

(71) Applicant: HONDA MOTOR CO., LTD., Tokyo (JP)

(72) Inventors: Kihoko Kaita, Wako (JP); Masashi Hagimoto, Wako (JP); Yoshiyuki Kuroba, Wako (JP); Hiroshi Maeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 179 days.

(21) Appl. No.: 17/021,505

(22) Filed: Sep. 15, 2020

(65) Prior Publication Data

US 2020/0407000 A1    Dec. 31, 2020

Related U.S. Application Data

(63) Continuation of application No. PCT/JP2018/012902, filed on Mar. 28, 2018.

(51) Int. Cl.
  *B62J 50/22* (2020.01)
  *B62J 17/04* (2006.01)

(52) U.S. Cl.
  CPC .............. *B62J 50/22* (2020.02); *B62J 17/04* (2013.01)

(58) Field of Classification Search
  CPC .................................. B62J 17/04; B62J 50/22
  See application file for complete search history.

(56) References Cited

U.S. PATENT DOCUMENTS

| | | | |
|---|---|---|---|
| 6,724,538 B2* | 4/2004 | Kushida | B62J 17/04 |
| | | | 359/630 |
| 7,327,239 B2* | 2/2008 | Gallant | G01P 1/04 |
| | | | 340/984 |

FOREIGN PATENT DOCUMENTS

| | | |
|---|---|---|
| JP | 10-305742 A | 11/1998 |
| JP | 2002219970 A | 8/2002 |
| JP | 2005306337 A | 11/2005 |
| JP | 2009173208 A | 8/2009 |
| JP | 2009196473 A | 9/2009 |
| JP | 2009298360 A | 12/2009 |
| JP | 2016216029 A | 12/2016 |
| JP | 2017021041 A | 1/2017 |
| JP | 2017128200 A | 7/2017 |

OTHER PUBLICATIONS

PCT Search Report and IPRP dated Feb. 2, 2020.

* cited by examiner

*Primary Examiner* — D Glenn Dayoan
*Assistant Examiner* — Melissa Ann Bonifazi
(74) *Attorney, Agent, or Firm* — Thomas | Horstemeyer, LLP (57) ABSTRACT

A straddle type vehicle characterized by comprising: an air guiding plate arranged on a front side of the straddle type vehicle; and a display control unit configured to display information concerning automatic traveling control of the straddle type vehicle, wherein the display control unit displays the information concerning the automatic traveling control on the air guiding plate.

10 Claims, 8 Drawing Sheets

STRADDLE TYPE VEHICLE

CROSS-REFERENCE TO RELATED APPLICATION

This application is a continuation of International Patent Application No. PCT/JP2018/012902 filed on Mar. 28, 2018, the entire disclosures of which is incorporated herein by reference.

BACKGROUND OF THE INVENTION

Field of the Invention

The present invention relates to a straddle type vehicle.

Description of the Related Art

Japanese Patent Laid-Open No. 2002-219970 discloses a four-wheel vehicle having an ACC (Adaptive Cruise Control) function and including a display unit that displays its information.

If the ACC function is applied to a straddle type vehicle, the driver needs a balancing operation of the vehicle, and needs to correctly recognize automatic traveling information concerning constant-speed traveling or following traveling in a short time because the distance interval to a peripheral vehicle is short as compared to a four-wheel vehicle, and the traffic environment frequently changes.

However, in the conventional technique, it is difficult for the driver of a straddle type vehicle to early recognize automatic traveling information.

The present invention provides a technique for allowing the driver of a straddle type vehicle to early correctly recognize automatic traveling information.

SUMMARY OF THE INVENTION

According to the present invention, there is provided a straddle type vehicle characterized by comprising: an air guiding plate arranged on a front side of the straddle type vehicle (100); and a display control unit configured to display information concerning automatic traveling control of the straddle type vehicle, wherein the display control unit displays the information concerning the automatic traveling control on the air guiding plate, and the display control unit changes a display position of the information concerning the automatic traveling control on the air guiding plate such that the higher a speed of the straddle type vehicle is, the closer the display position is set to a center of the air guiding plate in a vehicle width direction.

Further features of the present invention will become apparent from the following description of exemplary embodiments (with reference to the attached drawings).

Note that the same reference numerals denote the same or like components throughout the accompanying drawings.

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

Hereinafter, an embodiment of the present invention will be described with reference to the accompanying drawings. Note that the same reference numerals denote the same constituent elements throughput the drawings. In this specification, expressions "front", "rear", "upper", and "lateral side (left/right)" are sometimes used, and these are used as expressions representing relative directions with respect to a vehicle. For example, "front" represents the front side in the longitudinal direction of a vehicle, and "upper" represents the height direction of the vehicle.

Figure 1:
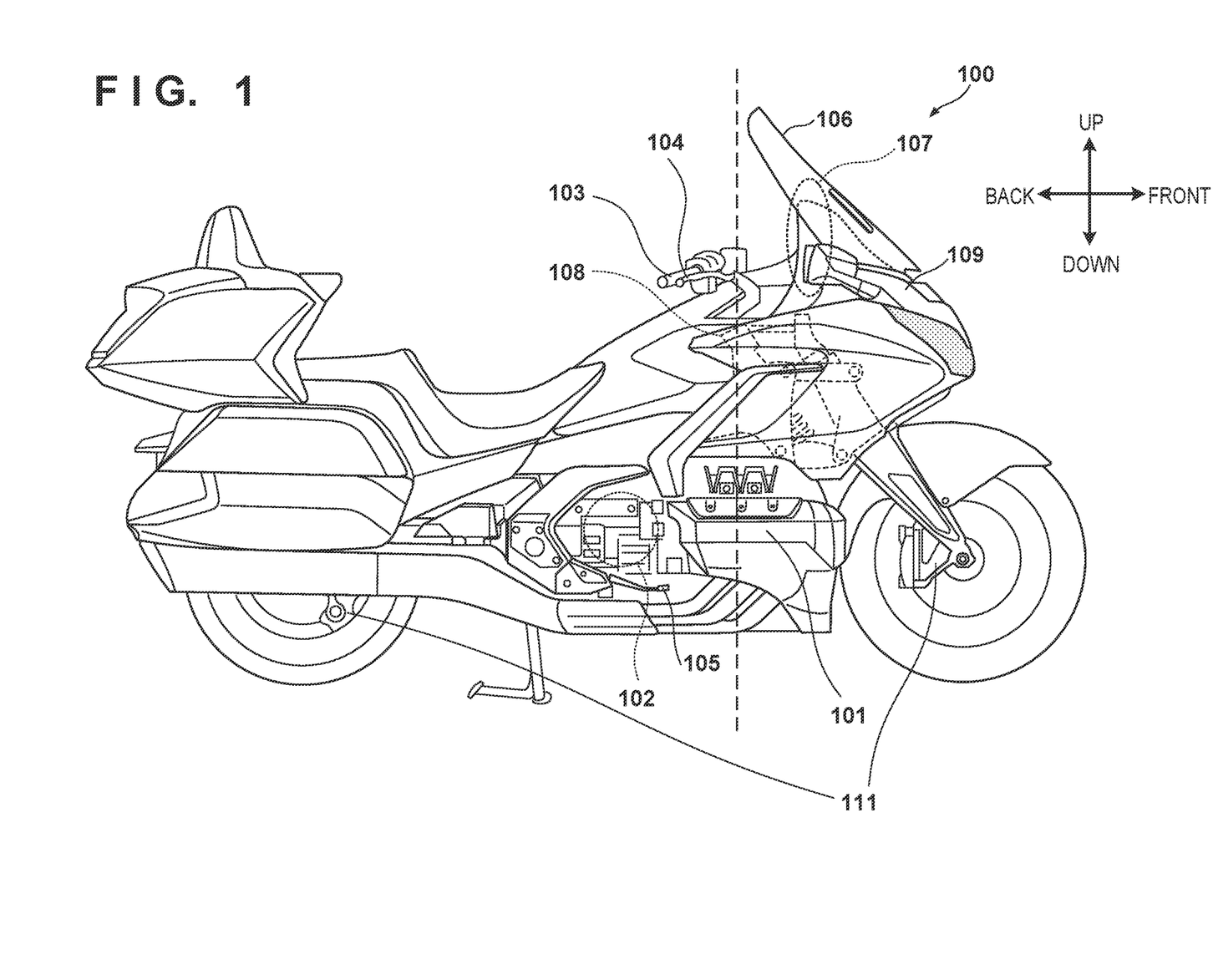
FIG. 1 is a view showing the outer appearance of a straddle type vehicle (motorcycle) according to an embodiment of the present invention.

FIG. 1 is a view showing the outer appearance of a motorcycle 100 that is an example of a straddle type vehicle to which the present invention can be applied. The motorcycle 100 includes an engine 101, a transmission 102, a steering handlebar 103, a front wheel brake lever 104, a rear wheel brake pedal 105, a windshield 106, a meter unit 107, a head pipe 108, a front cowl 109, and a brake device 111. The output of the engine 101 is transmitted to the transmission 102 via a clutch (not shown). The transmission 102 is a transmission having a plurality of gear ranges (for example, six or seven gear ranges). The output of the transmission 102 is transmitted to the rear wheel via a transmission mechanism (not shown) such as a propeller shaft.

The driver can accelerate by the throttle operation of the steering handlebar 103. Also, by operating the front wheel brake lever 104 and/or the rear wheel brake pedal 105, the brake device 111 can be controlled via an actuator (not shown) to do braking. Note that when executing an ACC (Adaptive Cruise Control: inter-vehicle distance control/vehicle speed control (constant-speed traveling control)) function, driving is performed such that the engine 101, the transmission 102, the brake device 111, and the like are automatically controlled to maintain a set inter-vehicle distance or a set vehicle speed.

The windshield 106 is a windbreak shield covering the front side of the driver, and functions as an air guiding plate. For example, the windshield 106 is made of a glass member. In this embodiment, the windshield 106 also functions as a screen that displays information. The meter unit 107 includes various kinds of information display units including a speed meter and a tachometer to be described later. The head pipe 108 is provided on the vehicle front side of a frame (not shown) and steerably supports the steering handlebar 103. The meter unit 107 is provided on the vehicle front side (front side) of the head pipe 108.

Figure 2:
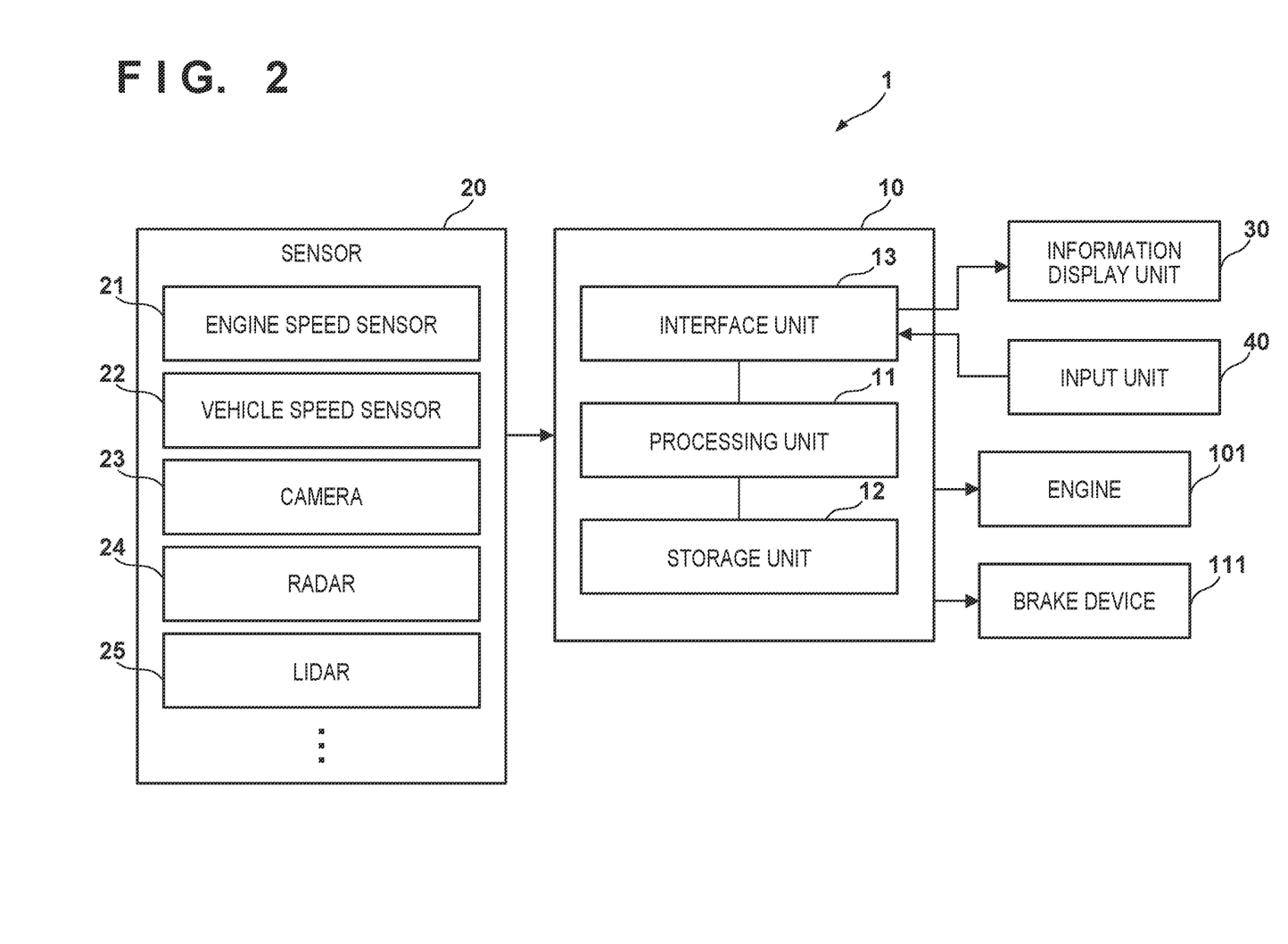
FIG. 2 is a block diagram of a control apparatus according to an embodiment of the present invention.

FIG. 2 is a block diagram of a control apparatus 1 according to an embodiment of the present invention. The control apparatus 1 includes a control unit 10. The control unit 10 includes a processing unit 11 such as a CPU, a storage unit 12 such as a RAM or a ROM, and an interface unit 13 that connects an external device and the processing unit 11. The interface unit 13 is connected to an information display unit 30 and an input unit 40.

In this embodiment, the information display unit 30 is a projection unit, and displays various kinds of information to be described later by projecting these on the windshield 106 functioning as an air guiding plate or on at least one of auxiliary air guiding plates 1061a and 1061b to be described later with reference to FIG. 3. Details of the projection unit will be described later. However, information display onto the air guiding plate is not limited to the method using the projection unit. For example, information may be displayed on the air guiding plate by forming the air guiding plate using a transparent organic EL display and controlling light emission of the light-emitting element of the transparent organic EL display. In this case, the information display unit 30 is the transparent organic EL display. Each of the auxiliary air guiding plates 1061a and 1061b may also be formed by a transparent organic EL display.

The input unit 40 accepts input of various kinds of information based on an operation of the driver. The input unit 40 includes, for example, an inter-vehicle distance setting switch (not shown), a cruise control switch (not shown), and the like. Setting of inter-vehicle distance control is done by the inter-vehicle distance setting switch, and setting of vehicle speed control (constant-speed traveling control) is done by the cruise control switch. The information of the set vehicle speed or set inter-vehicle distance can freely be selected and input by the driver. Set vehicle speed information is information set to make the motorcycle 100 travel at a constant speed. Set inter-vehicle distance information is information set to maintain the inter-vehicle distance between the motorcycle 100 and a preceding vehicle of the motorcycle 100 at a predetermined distance. The input unit 40 can also accept selection of a display position of information on the air guiding plate. The driver can freely set a position of the air guiding plate, where information should be displayed, by operating the input unit 40.

The processing unit 11 executes a program stored in the storage unit 12 to control the engine 101 and/or the brake device 111 based on the driving operation of the driver and/or the detection results of various kinds of sensors 20 and also control the display contents of the information display unit 30. The various kinds of sensors 20 include an engine speed sensor 21, a vehicle speed sensor 22, a camera 23, a radar 24, and/or a LiDAR (Light Detection and Ranging (LiDAR)) 25.

The engine speed sensor 21 is a sensor that detects the number of rotations of the engine 101. The vehicle speed sensor 22 detects the vehicle speed of the motorcycle 100. The camera 23 is, for example, an image capturing device using a CCD/CMOS image sensor. The radar 24 is, for example, a distance measuring device such as a millimeter wave radar. The LiDAR 25 is, for example, a distance measuring device such as a laser radar. These are arranged at positions where the peripheral information of the motorcycle 100 can be detected, for example, on the front side, the rear side, the upper side, and/or the lateral side of the vehicle. The ACC function can be executed based on the detected peripheral information.

For example, when the ACC function is used, in a case in which no preceding vehicle is detected, constant-speed traveling control can be performed such that the vehicle travels while keeping a preset vehicle speed by controlling acceleration/deceleration. Additionally, in a case in which a preceding vehicle is detected, automatic traveling control can be performed such that the vehicle travels while keeping an inter-vehicle distance set in advance by the driver with respect to the preceding vehicle by controlling acceleration/deceleration.

Figure 3:
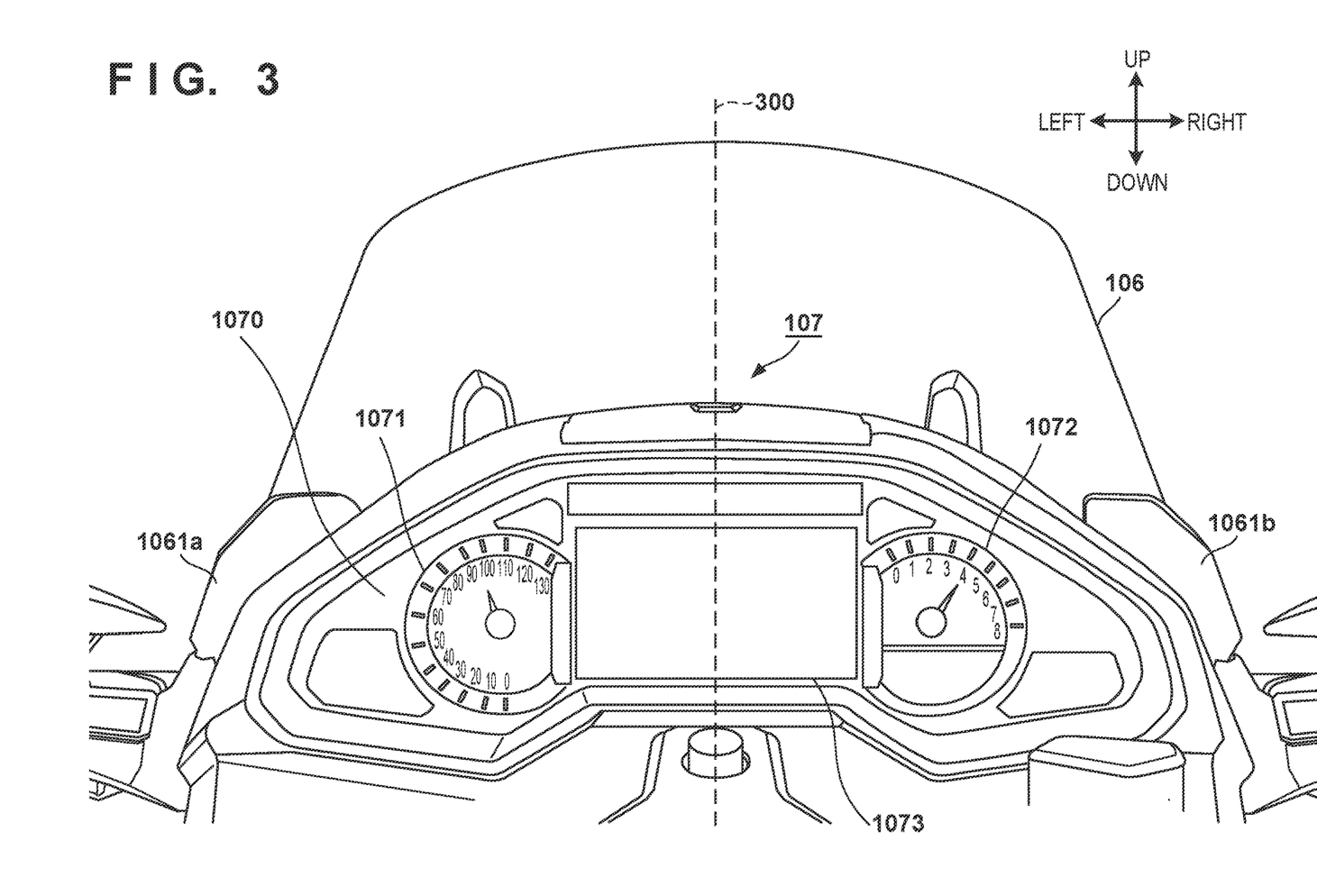
FIG. 3 is a plan view of a meter unit viewed from the side of the driver seat of the straddle type vehicle (motorcycle) according to an embodiment of the present invention.

FIG. 3 is a plan view of the meter unit 107 viewed from the side of the driver seat of the straddle type vehicle (motorcycle 100) according to an embodiment of the present invention. Reference numeral 300 in FIG. 3 represents a center line. A display panel 1070 of the meter unit 107 is provided with a speed meter (vehicle speed information display unit) 1071, a tachometer 1072, and a navigation information display unit 1073. Reference numerals 1061a and 1061b denote auxiliary air guiding plates provided in addition to the main air guiding plate (windshield 106). The auxiliary air guiding plates 1061a and 1061b have a size smaller than the air guiding plate (windshield 106). As an example, the surface may be formed flat. In this embodiment, the auxiliary air guiding plates 1061a and 1061b also function as screens that display information.

The speed meter (vehicle speed information display unit) 1071 displays the speed of the straddle type vehicle (motorcycle 100) detected by the vehicle speed sensor 22. In the example shown in FIG. 3, the speed meter 1071 is configured to change the display position of vehicle speed information in a curve (arc) in accordance with a change in the speed of the motorcycle 100. However, the change may be not a curve but linear.

The tachometer 1072 is a measuring instrument that measures/displays the number of rotations of the engine 101 detected by the engine speed sensor 21. In the example shown in FIG. 3, it is possible to measure a speed of 0 to 8,000 r/min. The navigation information display unit 1073 displays various kinds of navigation information used to guide traveling up to a destination.

Figure 4:
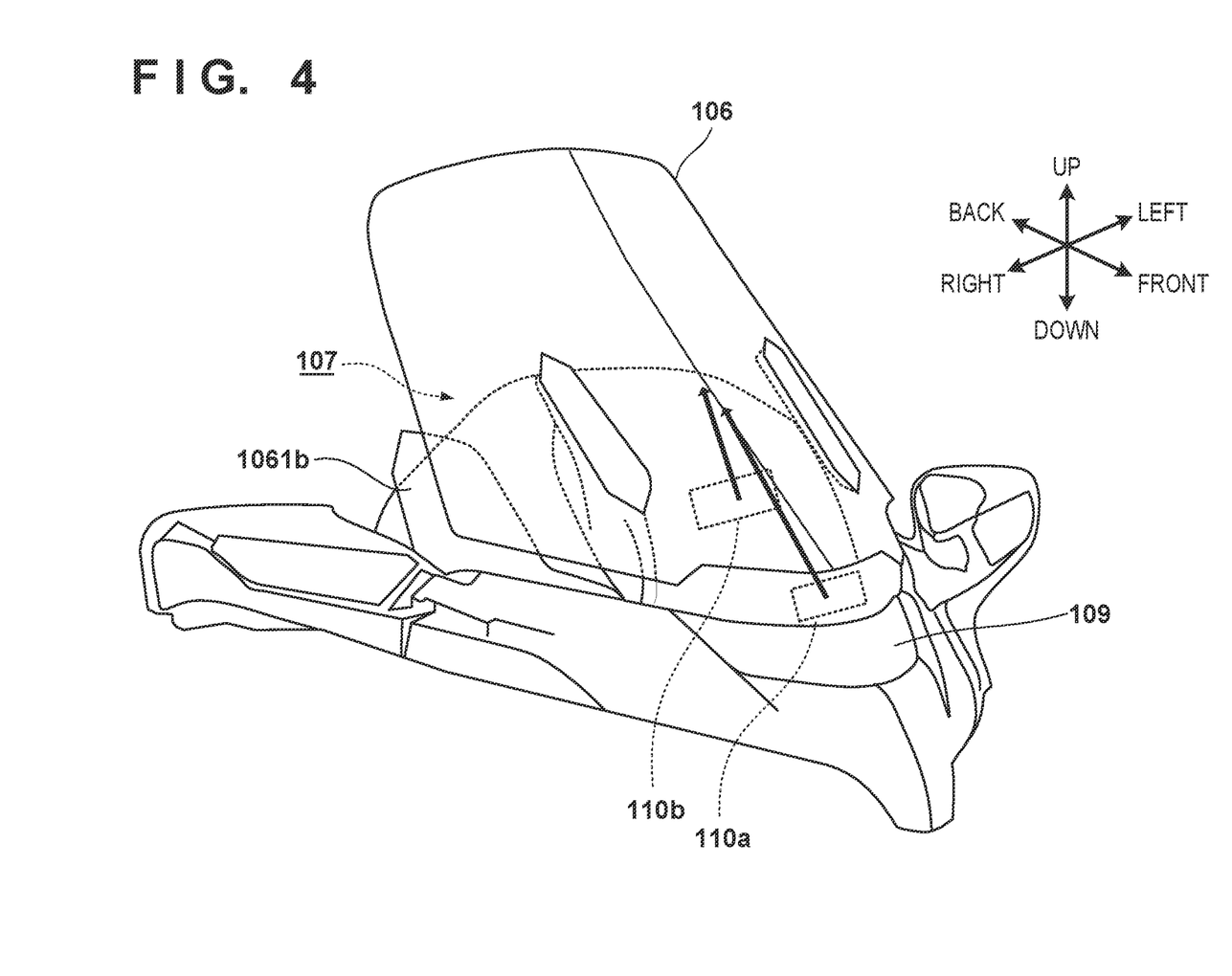
FIG. 4 is a view showing the outer appearance near a front cowl and an air guiding plate when the straddle type vehicle (motorcycle) according to an embodiment of the present invention is viewed from the front right side of the vehicle.

FIG. 4 is a view showing the outer appearance near the front cowl and the air guiding plate when the straddle type vehicle (motorcycle) according to an embodiment of the present invention is viewed from the front right side of the vehicle. The information display unit 30 according to this embodiment is a projection unit and is provided at the position of, for example, a projection unit 110a or a projection unit 110b to project and display information concerning automatic traveling control in the direction of the air guiding plate indicated by an arrow. The information concerning automatic traveling control includes the information of a set inter-vehicle distance and/or a set vehicle speed when traveling by ACC control.

In the example shown in FIG. 4, the projection unit 110a is provided at a position of the front cowl 109 inside the vehicle, and the projection unit 110b is provided on the rear side (on the vehicle front side) of the meter unit 107. Providing any one of these suffices. In addition, the installation positions of the projection units are not limited to these examples if information can be projected on the air guiding plate.

Figure 5:
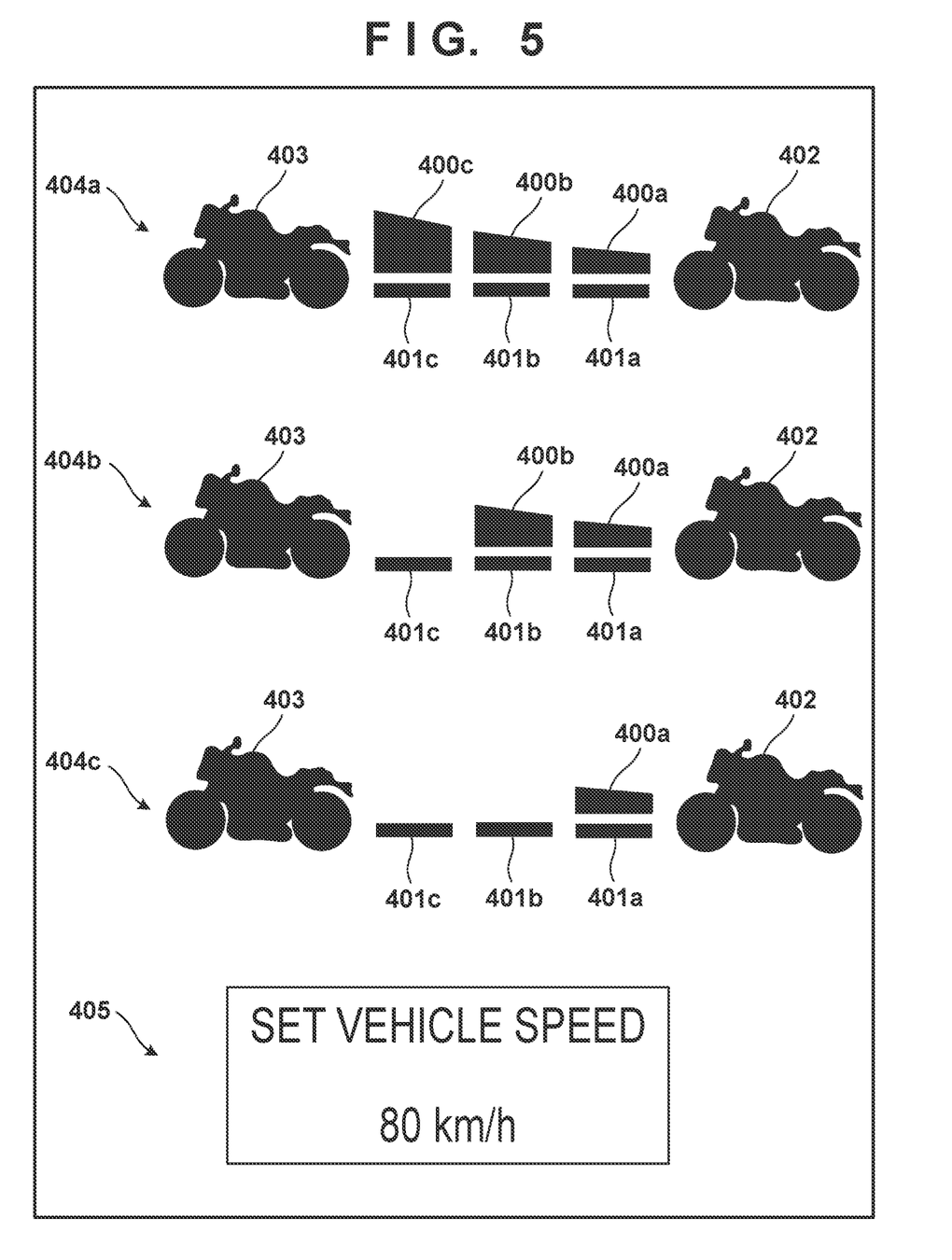
FIG. 5 is a view showing an example of information concerning automatic traveling control according to an embodiment of the present invention.

As an example of information concerning automatic traveling control, a display example of information of a set inter-vehicle distance and a set vehicle speed will be described here with reference to FIG. 5. When the ACC function is started by the operation of the driver, inter-vehicle distance information can be displayed. At this time, set inter-vehicle distance information currently set by the driver is displayed.

Three trapezoidal blocks 400a, 400b, and 400c are arranged in series between a self-vehicle symbol 402 on the right side and a preceding vehicle symbol 403 on the left side, and three rod-shaped subblocks 401a, 401b, and 401c having the same length as the blocks 400a, 400b, and 400c are arranged in series along the lower portions of the three blocks 400a, 400b, and 400c. The information of the set inter-vehicle distance information is expressed by changing their display forms.

When the ACC function is working, the self-vehicle symbol 402 and the three subblocks 401a, 401b, and 401c are in an always displayed state. However, the display states of the three blocks 400a, 400b, and 400c change in accordance with the set inter-vehicle distance. More specifically, if the inter-vehicle distance is "long", all the three blocks 400a, 400b, and 400c are in a displayed state (404a). If the inter-vehicle distance is "medium", the block 400a on the right side and the block 400b at the center are in the displayed state, and the left block 400c is in a non-displayed state (404b). If the inter-vehicle distance is "short", only the block 400a on the right side is in the displayed state, and the blocks 400b at the center and the left block 400c are in the non-displayed state (404c). Note that an example in which the inter-vehicle distances are set in three stages has been described here. The number of stages can be arbitrary if there are a plurality of stages.

If a preceding vehicle is detected, and automatic following control is performed, the preceding vehicle symbol 403 is displayed in addition to the self-vehicle symbol 402, and current set vehicle speed information 405 is further displayed. The set vehicle speed information 405 is vehicle speed information input and set by the driver via the input unit 40. If a preceding vehicle is not detected, constant-speed traveling control at the set vehicle speed is performed.

Figure 6:
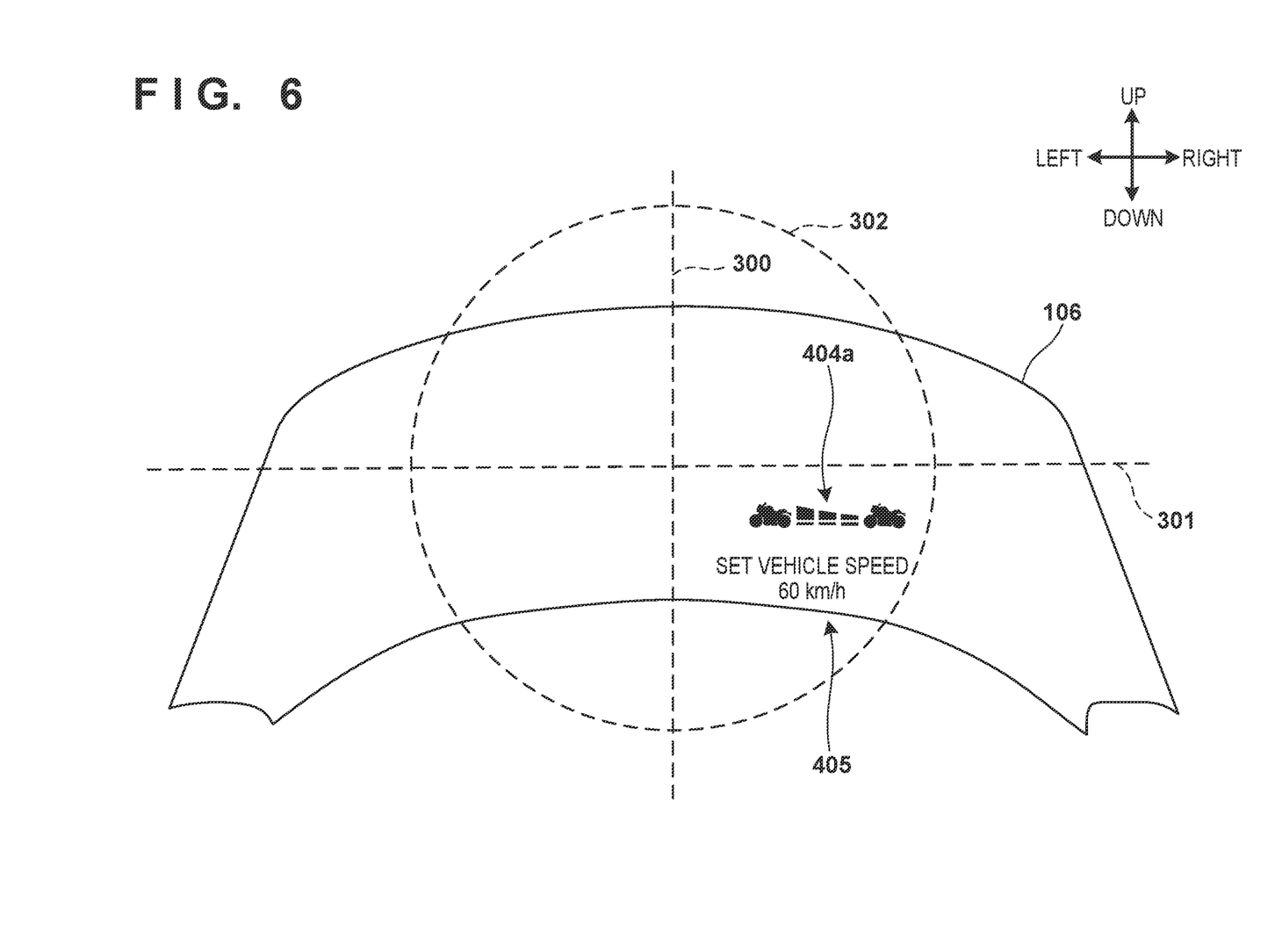
FIG. 6 is a view showing an example (in normal traveling) of a display form of information concerning automatic traveling control according to an embodiment of the present invention.

The display form of information concerning automatic traveling control will be described next with reference to FIGS. 6 to 8. FIG. 6 is a view showing an example (in normal traveling) of the display form of information concerning automatic traveling control according to an embodiment of the present invention. In normal traveling that is not high-speed traveling, the processing unit 11 performs display control such that information concerning automatic traveling control is displayed in a center area 302 of the air guiding plate in the vehicle width direction, which is indicated by a circular dotted line with respect to the intersection between the line 300 and a line 301 as the center. When the information is displayed near the center in the vehicle width direction, where the curvature of the air guiding plate is small, the driver can easily visually recognize the information.

In addition, display control may be performed to display information concerning automatic traveling control on the lower side of the air guiding plate in the vehicle vertical direction (for example, on the lower side of the line 301). When the information is displayed on the lower side in the vehicle vertical direction, where the curvature of the air guiding plate is small, the visibility can be improved. When projecting and displaying information on the air guiding plate, it is possible to reduce the distortion of a projected image and perform correct information display. In the example of FIG. 6, in the center area 302 in the vehicle width direction and on the lower side in the vehicle vertical direction, the information 404a of the set inter-vehicle distance representing a set inter-vehicle distance "long" is displayed, and set vehicle speed information representing a set vehicle speed of 60 km/h is displayed.

Figure 7:
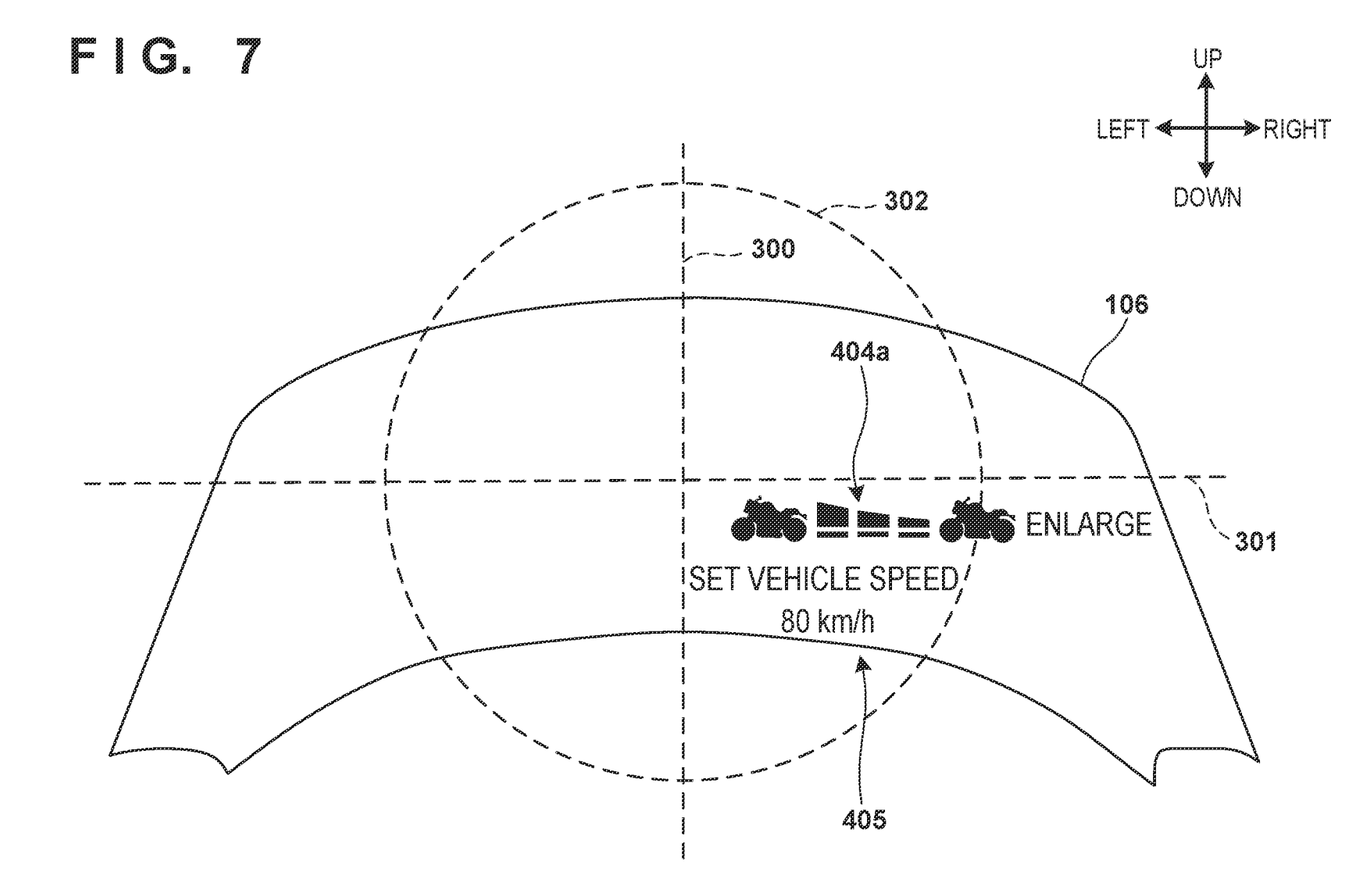
FIG. 7 is a view showing an example (in high-speed traveling) of a display form of information concerning automatic traveling control according to an embodiment of the present invention.
Figure 8:
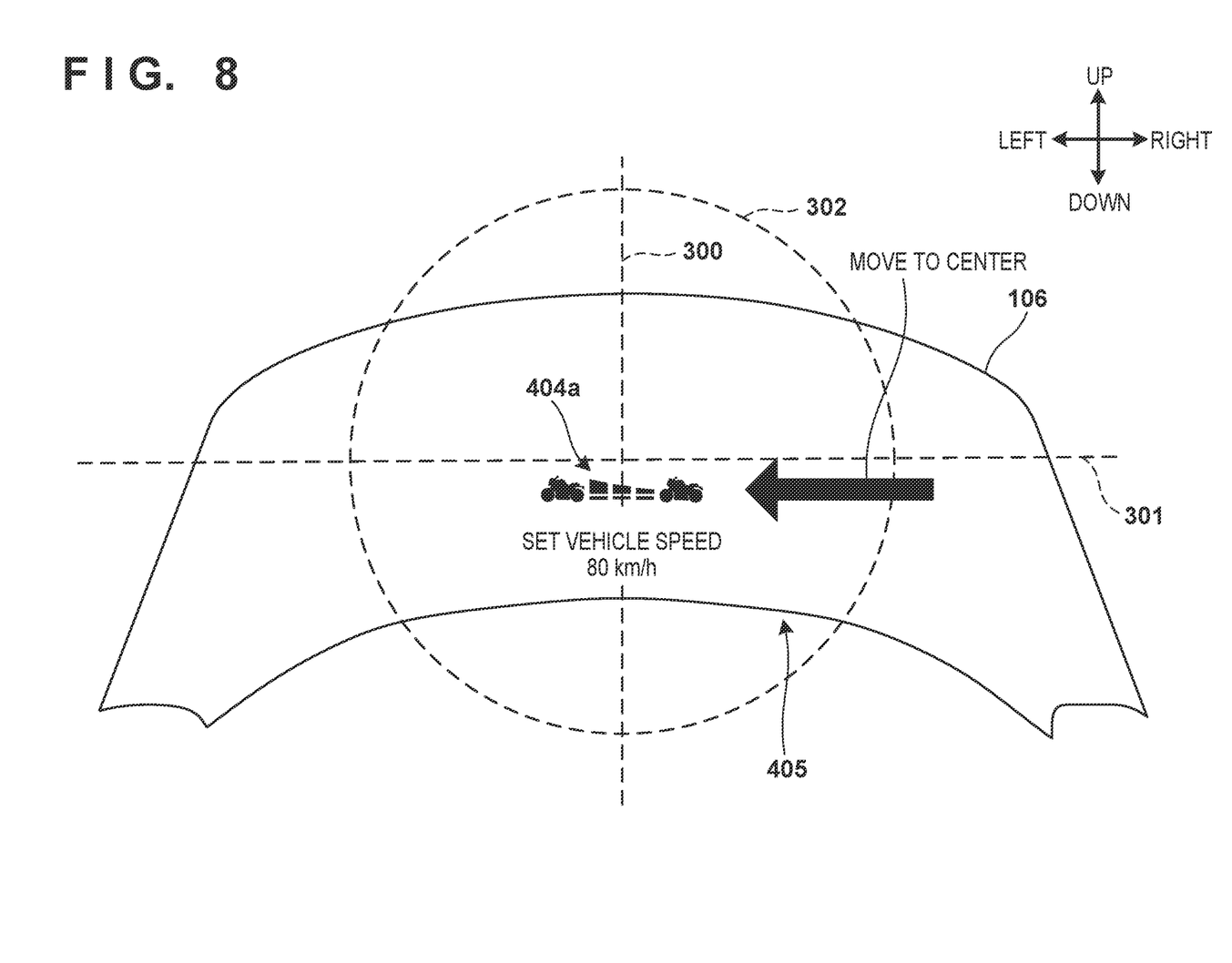
FIG. 8 is a view showing an example (in high-speed traveling) of a display form of information concerning automatic traveling control according to an embodiment of the present invention.

FIGS. 7 and 8 are views showing examples (in high-speed traveling) of the display form of information concerning automatic traveling control according to an embodiment of the present invention. In high-speed traveling, it is necessary to allow the driver to visually recognize the information in a shorter time. To do this, the processing unit 11 may change the display size of the information concerning automatic traveling control in accordance with the speed of the straddle type vehicle (motorcycle 100) detected by the vehicle speed sensor 22. For example, as shown in FIG. 7, if the set vehicle speed is 80 km/h, the vehicle speed of the motorcycle 100 also readily enters a high speed range when the ACC function is being executed. In this case, the display size of the information concerning the automatic traveling control may be changed to a larger size. This allows the driver to visually recognize the information in a shorter time.

Note that control may be done such that the higher the speed is, the larger the display size is. Alternatively, control may be done to increase the display size if the speed exceeds a predetermined threshold. As the predetermined threshold, a plurality of thresholds may be provided. That is, if the speed exceeds a first threshold, information may be displayed in a first display size larger than the display size when the speed is equal to or lower than the first threshold. If the speed exceeds a second threshold larger than the first threshold, information may be displayed in a second display size larger than the first display size.

Alternatively, the processing unit 11 may change the display position of information concerning automatic traveling control on the air guiding plate in accordance with the speed of the straddle type vehicle (motorcycle 100) detected by the vehicle speed sensor 22. For example, as shown in FIG. 8, the display size is kept unchanged, and the display position is moved to the center of the air guiding plate. Since information is displayed at a position easier for the driver to see, the information can visually be recognized in a short time. Note that control may be done such that the higher the speed is, the closer the display position is set to the center of the air guiding plate. Alternatively, control may be done to move the display position to the center of the air guiding plate if the speed exceeds a predetermined threshold.

Additionally, control may be done to change both the display size and the display position of information in accordance with the speed. For example, in the high speed range, the display size may be increased, and the display position may be changed to the center of the air guiding plate in the vehicle width direction. Since information is displayed at a position easier for the driver to see and in a size easier to see, the information can visually be recognized in a short time.

Note that FIGS. 6 to 8 show display examples of the information 404a representing a set inter-vehicle distance "long". However, the information 404b or 404c is displayed in accordance with a set inter-vehicle distance "medium" or "short", as a matter of course.

Information display according to this embodiment can also be applied to a movable air guiding plate capable of moving the position of the windshield.

In addition, a part of information concerning automatic traveling control may be displayed on the air guiding plate (windshield 106), and the remaining part may be displayed on at least one of the auxiliary air guiding plates 1061a and 1061*b*. Alternatively, whole information concerning automatic traveling control may be displayed on at least one of the auxiliary air guiding plates 1061*a* and 1061*b*.

When the information is displayed on the auxiliary air guiding plates 1061*a* and 1061*b*, they do not disturb the line of sight as compared to the air guiding plate (windshield 106) that is the main screen. It is therefore possible to provide a satisfactory traveling environment. Furthermore, since the auxiliary air guiding plates 1061*a* and 1061*b* can be formed into a flat shape as compared to the air guiding plate (windshield 106), distortion of the displayed information is small, and the visibility is high.

The present invention is not limited to the above embodiments and various changes and modifications can be made within the spirit and scope of the present invention. Therefore, to apprise the public of the scope of the present invention, the following claims are made.

According to a first aspect of the present invention, there is provided a straddle type vehicle characterized by comprising:

an air guiding plate (106) arranged on a front side of the straddle type vehicle (100); and a display control unit (11) configured to display information concerning automatic traveling control of the straddle type vehicle, wherein the display control unit displays the information concerning the automatic traveling control on the air guiding plate.

In the straddle type vehicle according to a second aspect of the present invention, the display control unit displays the information concerning the automatic traveling control at a center (302) of the air guiding plate in a vehicle width direction.

In the straddle type vehicle according to a third aspect of the present invention, the display control unit displays the information concerning the automatic traveling control on a lower side of the air guiding plate in a vehicle vertical direction.

In the straddle type vehicle according to a fourth aspect of the present invention, the straddle type vehicle further comprises an auxiliary air guiding plate (1061*a*, 1061*b*) arranged on the front side of the straddle type vehicle, wherein the display control unit displays at least a part of the information concerning the automatic traveling control on the auxiliary air guiding plate.

In the straddle type vehicle according to a fifth aspect of the present invention, the display control unit changes a display size of the information concerning the automatic traveling control in accordance with a speed of the straddle type vehicle.

In the straddle type vehicle according to a sixth aspect of the present invention, the display control unit changes a display position of the information concerning the automatic traveling control on the air guiding plate in accordance with the speed of the straddle type vehicle.

In the straddle type vehicle according to a seventh aspect of the present invention, the straddle type vehicle further comprises an input unit (40) for accepting selection of the display position of the information concerning the automatic traveling control on the air guiding plate.

In the straddle type vehicle according to an eighth aspect of the present invention, the straddle type vehicle further comprises a projection unit (110*a*, 110*b*) provided on a front cowl of the straddle type vehicle, wherein the display control unit displays the information concerning the automatic traveling control on the air guiding plate by projecting, by the projection unit, the information concerning the automatic traveling control on the air guiding plate.

In the straddle type vehicle according to a ninth aspect of the present invention, the air guiding plate is formed by a transparent organic EL display, and the display control unit displays the information concerning the automatic traveling control on the air guiding plate by controlling light emission of a light-emitting element of the transparent organic EL display.

In the straddle type vehicle according to a tenth aspect of the present invention, the information concerning the automatic traveling control includes set vehicle speed information (405) set to cause the straddle type vehicle (100) to travel at a constant speed.

In the straddle type vehicle according to an eleventh aspect of the present invention, the information concerning the automatic traveling control includes set inter-vehicle distance information (404*a*, 404*b*, 404*c*) set to maintain an inter-vehicle distance between the straddle type vehicle (100, 402) and a preceding vehicle (403) of the straddle type vehicle at a predetermined distance.

According to a twelfth aspect of the present invention, there is provided a straddle type vehicle comprising:

an air guiding plate (106) arranged on a front side of the straddle type vehicle (100);

an auxiliary air guiding plate (1061*a*, 1061*b*) smaller than the air guiding plate; and a display control unit (10) configured to display information concerning automatic traveling control of the straddle type vehicle, wherein the display control unit displays the information concerning the automatic traveling control on the auxiliary air guiding plate.

According to a first aspect of the present invention, information acquisition can be performed in a short time by displaying information concerning automatic traveling control on the air guiding plate, and a satisfactory driving environment can be provided even under an ACC environment. Hence, the driver of the straddle type vehicle can early correctly recognize automatic traveling information.

According to a second aspect of the present invention, visibility can be improved by displaying the information at the center in the vehicle width direction, where the curvature of the air guiding plate is small. In particular, if the information is projected and displayed on the air guiding plate, it is possible to reduce the distortion of the projected image and correctly display the information.

According to a third aspect of the present invention, visibility can be improved by displaying the information on the lower side in the vehicle vertical direction, where the curvature of the air guiding plate is small. In particular, if the information is projected and displayed on the air guiding plate, it is possible to reduce the distortion of the projected image and correctly display the information.

According to a fourth aspect of the present invention, the information is displayed on the auxiliary air guiding plate. Since this does not disturb the line of sight as compared to the air guiding plate that is the main screen, it is possible to provide a satisfactory traveling environment. Furthermore, since the auxiliary air guiding plate can be formed into a flat shape as compared to the air guiding plate, distortion of the displayed information is small, and the visibility is high.

According to a fifth aspect of the present invention, the information can appropriately visually be recognized in accordance with the speed. For example, in a high speed range where information recognition in a shorter time is needed, the display size of the information is made large, thereby improving visibility.

According to a sixth aspect of the present invention, the information can appropriately visually be recognized in accordance with the speed. For example, in a high speed range where the effective visual field angle is small, and information recognition in a shorter time is needed, the display position of the information is changed to an appropriate position (for example, the center in the vehicle width direction), thereby improving visibility.

According to a seventh aspect of the present invention, since the display position can freely be adjusted for each driver, and information display suitable for an individual can be performed, visibility can be improved.

According to an eighth aspect of the present invention, the projection means is provided, and the information is projected on an existing windshield serving as an air guiding plate, thereby displaying the information. It is therefore possible to perform information display at a low cost.

According to a ninth aspect of the present invention, since any projection means need not be provided, the apparatus can be prevented from becoming bulky. In addition, since precise information can be displayed at a high brightness, visibility can be improved.

According to a tenth aspect of the present invention, the set vehicle speed information can efficiently visually be recognized, and a satisfactory driving environment can be provided.

According to claim an eleventh aspect of the present invention, the set inter-vehicle distance information can efficiently visually be recognized, and a satisfactory driving environment can be provided.

According to claim a twelfth aspect of the present invention, the information is displayed on the auxiliary air guiding plate. Since this does not disturb the line of sight as compared to the air guiding plate that is the main screen, it is possible to provide a satisfactory traveling environment. Furthermore, since the auxiliary air guiding plate can be formed into a flat shape as compared to the air guiding plate, distortion of the displayed information is small, and the visibility is high.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A straddle type vehicle comprising:
   an air guiding plate arranged on a front side of the straddle type vehicle; and
   a display control unit configured to display information concerning automatic traveling control of the straddle type vehicle,
   wherein the display control unit displays the information concerning the automatic traveling control on the air guiding plate, and the display control unit changes a display position of the information concerning the automatic traveling control on the air guiding plate such that the higher a speed of the straddle type vehicle is, the closer the display position is set to a center of the air guiding plate in a vehicle width direction.

2. The straddle type vehicle according to claim 1, wherein the display control unit displays the information concerning the automatic traveling control at a center of the air guiding plate in a vehicle width direction.

3. The straddle type vehicle according to claim 1, wherein the display control unit displays the information concerning the automatic traveling control on a lower side of the air guiding plate in a vehicle vertical direction.

4. The straddle type vehicle according to claim 1, further comprising an auxiliary air guiding plate arranged on the front side of the straddle type vehicle,
   wherein the display control unit displays at least a part of the information concerning the automatic traveling control on the auxiliary air guiding plate.

5. The straddle type vehicle according to claim 1, wherein the display control unit changes a display size of the information concerning the automatic traveling control in accordance with a speed of the straddle type vehicle.

6. The straddle type vehicle according to claim 1, further comprising an input unit configured to accept selection of the display position of the information concerning the automatic traveling control on the air guiding plate.

7. The straddle type vehicle according to claim 1, further comprising a projection unit provided on a front cowl of the straddle type vehicle,
   wherein the display control unit displays the information concerning the automatic traveling control on the air guiding plate by projecting, by the projection unit, the information concerning the automatic traveling control on the air guiding plate.

8. The straddle type vehicle according to claim 1, wherein the air guiding plate is formed by a transparent organic EL display, and
   the display control unit displays the information concerning the automatic traveling control on the air guiding plate by controlling light emission of a light-emitting element of the transparent organic EL display.

9. The straddle type vehicle according to claim 1, wherein the information concerning the automatic traveling control includes set vehicle speed information set to cause the straddle type vehicle to travel at a constant speed.

10. The straddle type vehicle according to claim 1, wherein the information concerning the automatic traveling control includes set inter-vehicle distance information set to maintain an inter-vehicle distance between the straddle type vehicle and a preceding vehicle of the straddle type vehicle at a predetermined distance.

* * * * *